United States Patent [19]

Atanassov et al.

[11] Patent Number: 5,027,286

[45] Date of Patent: Jun. 25, 1991

[54] PERIPHERAL CONTROL DEVICE

[75] Inventors: Lyuben P. Atanassov; Yanko A. Kolenzov; Decho I. Vulev; Ivan S. Primov; Peter G. Spassov; Svetlosar K. Kanalev, all of Plovdiv; Dimo P. Andonov, Sofia; Angel V. Yankov; Nikolay G. Dilkin, both of Plovdiv, all of Bulgaria

[73] Assignee: Institute "Kompleksna Avtomatisazia na Montaja", Plovdiv, Bulgaria

[21] Appl. No.: 395,111

[22] Filed: Aug. 16, 1989

[30] Foreign Application Priority Data

Aug. 16, 1988 [BG] Bulgaria ................................. 85259

[51] Int. Cl.⁵ ............................................. G06F 15/00
[52] U.S. Cl. .................................... 364/513; 360/33.1; 360/35.1
[58] Field of Search ............... 364/513; 360/33.1, 35.1

[56] References Cited

U.S. PATENT DOCUMENTS

| | | | |
|---|---|---|---|
| 4,140,953 | 2/1979 | Dunne | 364/513 |
| 4,270,150 | 5/1981 | Diermann et al. | 360/35.1 |
| 4,343,367 | 8/1982 | Mashimo | 364/513 |
| 4,477,847 | 10/1984 | Knight et al. | 360/35.1 |
| 4,608,525 | 8/1986 | Mori et al. | 364/513 |

Primary Examiner—Allen R. MacDonald
Assistant Examiner—George Davis
Attorney, Agent, or Firm—Klein & Vibber

[57] ABSTRACT

A peripheral control device applicable in robotics for control of educational robots operated by stepper motors performs reliably positioning tasks of a great number of steps with a great number of axes controlled with different velocity and realizes, by means of digital inputs and outputs, a reliable connection with the technological equipment with minimum participation of the microprocessor which controls it. The device is controlled by a microprocessor and contains a buffer for addresses, a second buffer for control signals, a bidirectional buffer for data, a decoder, a register for digital inputs, a second register for digital outputs, a third register for availabilities, a fourth register for directions, a fifth register for movements, and a sixth register for the control of a programmable counter. The programmable counter sets the rotation velocities of the stepper motors. The device also contains an initial setting circuit, a monostable multivibrator, n stepper motor control units which receive and execute the positioning tasks, an n-channel shaper and a relays.

4 Claims, 4 Drawing Sheets

PERIPHERAL CONTROL DEVICE

FIELD OF THE INVENTION

The invention is related to a peripheral control device and is applicable in robotics for educational robots control.

BACKGROUND OF THE INVENTION

There is a well known peripheral control device for educational and industrial robots operated by direct current motors and controlled by a microprocessor. See, SERPENT-SCARA ROBOTS—S.P.E.C. LTD, England. The device contains a multiplexed analog to digital converter and a multiplexed digital to analog converter securing inputs and outputs to the analog voltages with high resolution. The position of each rotary axis is monitored by means of a potentiometric sensor whose output signals through the analog to digital converter is read by the microprocessor which transmits a position task through the digital to analog converter. This task and the voltage from the potentiometric sensor are monitored by a comparator on whose output a voltage is obtained, proportional to the error. The voltage is fed to the input of an operational amplifier whose voltage is controlled by a second digital to analog converter. The gain of the amplifier is programmed by the microprocessor through the digital to analog converter. The operational amplifier output is connected to the input of a second power operational amplifier, securing the current to the direct-current motor. The servocontrol with position feedback thus realized enables program control by the microprocessor of the d.c. motors movement laws, corresponding to the robot axes.

The disadvantages to the known peripheral control device in its application to educational robots control are its complexity, demanding the application of high precision components realized by complicated and unprofitable technology, and the considerable direct participation of the microprocessor in the robot control.

There is also a known educational robot control device, Bulgarian Authorship certificate 38210 for "Educational Robot Control Device", operated by stepper motors, which contains a decoder, connected to address and control buses of a microprocessor whose data and control buses are connected to a signal shaper. Decoder outputs are connected to an input register and an output register which are connected through a dataway to the signal shaper. The input register is connected through a logic check circuit to a power node, consisting of transistor switches, switching the windings of robot stepper motors. An output of the logic check circuit and an output of the external data signals are connected to the inputs of the output register.

A disadvantage of this known device is that it can not perform positioning tasks of more than one step and the microprocessor must feed new, strictly determinate data in the input register for each move to a new step of each stepper motor. With a great number of axes, respectively stepper motors, controlled with different velocity, the microprocessor must spend too much time for execution of the subprograms controlling robot movements. Another disadvantage is that there is no apparatus clearing of the noises in external data signals from sensors and clearing must be realized by means of a computer program after a repeated output register data reading.

SUMMARY OF THE INVENTION

An object of the present invention is to design a peripheral control device for educational robots, operated by stepper motors, controlled by a microprocessor, which performs reliably positioning tasks of a great number of steps with a great number of axes controlled with different velocity, and realizes by means of digital inputs and outputs a reliable connection with the technological equipment of the robots, consisting of sensors, electromagnets, etc., with minimum participation of the microprocessor.

This problem is solved by means of a peripheral control device which contains an address buffer, the inputs of which are connected to the microprocessor address buses and the outputs are connected to the inputs of a decoder whose second inputs are connected to the outputs of a control buffer, the inputs of which are connected to the microprocessor control buses. The write-read outputs of the control buffer are connected to the direction input of a bidirectional buffer whose selection input is connected to a first output of the decoder.

The data buses of the microprocessor are bidirectionally connected to inputs/outputs of the bidirectional buffer whose second inputs/outputs are connected to: the outputs of a register for digital input; the data inputs of a register for digital output; the outputs of a register for availabilities; the data inputs of a register for directions; to the data inputs of a register for movements; to the data inputs of n stepper motor control units; and to the data inputs of a counter control register for controlling velocities.

A second output of the decoder is connected to the write-enabling input of the input register, a third output is connected to the write input or the output register, a fourth output is connected to the write-enabling input of the availabilities register, a fifth output is connected to the write input of the directions register, a sixth output is connected to the write input of the movements register, a seventh output is connected to the loading input of the first stepper motor control unit, an n-6th output is connected to the loading input of the n-th stepper motor control unit, and an n-7th output is connected to the write input of the counter control register.

The reset outputs of the control buffer are connected to the input of an initial setting circuit whose output is connected to the reset inputs of the output register and movements register and the first and n-th stepper motor control units.

The clock outputs of the control buffer are connected to the input of a monostable multivibrator whose output is connected to the counting input of a programmable counter, the inputs of which are connected to the outputs of the counter control register as mentioned above.

The first output of the counter is connected to the clock input of the first stepper motor control unit, and an n-th output is connected to the clock input of the n-th stepper motor control unit.

An output of the directions register is connected to the direction input of the first stepper motor control unit, and an n-th output is connected to the direction input of the n-th stepper motor control unit.

An output of the movements register is connected to the movement input of the first stepper motor control unit, and an n-th output is connected to the movement input of the n-th stepper motor control unit.

An availability output of the first stepper motor control unit is connected to an input of the availabilities register whose n-th input is connected to the availability output of the n-th stepper motor control unit.

Outputs of the first stepper motor control unit are connected to the windings of the first stepper motor of the robot, and outputs of the n-th stepper motor control unit are connected to the windings of the n-th stepper motor of the robot.

Sensors are connected to the inputs of an n-channel shaper whose outputs are connected to inputs of the input register, and outputs of the output register are connected to relays which are connected to the actuating mechanisms, controlled by them.

The shaper is an n-channel one, and each channel contains a resistor, an opto-isolator, a second resistor, a Schmitt trigger, a monostable multivibrator, an RS-trigger and a NOR circuit. One end of the sensor is connected through the first resistor to the opto-isolator anode, and the other to the opto-isolator cathode. The opto-isolator emitter is connected to logic zero, and its collector is connected through the second resistor to the supply voltage, and also to the input of the Schmitt trigger. The output of the Schmitt trigger is connected to the input of the monostable multivibrator and to the setting input of the RS-trigger and to an input of the NOR circuit. The output of the monostable multivibrator is connected to a second input of the NOR circuit and to the reset input of the RS-trigger whose output is connected to a third input of the NOR circuit. The output of the NOR is connected to a corresponding input of the input register.

The stepper motor control unit contains a synchronous subtract counter, a D-trigger, a NAND circuit, a second RS-trigger, an OR circuit, a programmable read-only memory, a D-register and a stepper motor bipolar control circuit. The data inputs of the synchronous subtract counter are connected to the second inputs/outputs of the bidirectional data buffer, and the corresponding output of the decoder is connected to the loading input of the synchronous subtract counter and to the setting input of the D-trigger whose output is connected to an input of the NAND circuit and to the corresponding input of the availabilities register. The output of the NAND circuit is connected to the setting input of the second RS-trigger whose output is connected to an input of the OR circuit and to an input of the programmable read-only memory. The corresponding output of the programmable counter is connected to the clock input of the D-register and a second input of the OR circuit, the output of which is connected to the counting input of the synchronous subtract counter whose carry output is connected to the clock input of the D-trigger, the D-input of which is connected to logic zero. The output of the initial setting circuit is connected to the reset inputs of the D-trigger and D-register, and the corresponding output of the movements register is connected to a second input of the NAND circuit and to a D-input of the D-register whose corresponding output is connected to the reset input of the second RS-trigger and to the current input of the stepper motor bipolar control circuit. The corresponding output of the directions register is connected to a second input of the programmable read-only memory, an output of which is connected to a second D-input of the D-register whose corresponding second output is connected to a phase input of the stepper motor bipolar control circuit and to a third input of the programmable read-only memory, a second output of which is connected to a third D-input of the D-register whose corresponding third output is connected to a fourth input of the programmable read-only memory and to a second phase input of the stepper motor bipolar control circuit.

The first two outputs of the stepper motor bipolar control circuit are connected to the two ends of the winding of the corresponding stepper motor, and the second two outputs are connected to the two ends of its second winding.

In an alternate embodiment, the stepper motor control units contain a synchronous subtract counter, a D-trigger, a NAND circuit, a second RS-trigger, an OR circuit, a second D-trigger, a second D-register, a multiplexor and a stepper motor bipolar control circuit, the data inputs of the synchronous subtract counter being connected to the second inputs/outputs of the bidirectional data buffer, and the corresponding output of the decoder is connected to the loading input of the synchronous subtract counter and to the setting input of the first D-trigger whose output is connected to an input of the NAND circuit and to the corresponding input of the availabilities register. The output of the NAND circuit is connected to the setting input of the second RS-trigger whose output is connected to an input of the OR circuit. The corresponding output of the programmable counter is connected to the clock input of the second D-trigger and to a second input of the OR circuit, the output of which is connected to the clock input of the second D-register and to the counting input of the synchronous subtract counter whose carry output is connected to the clock input of the first D-trigger, the D-input of which is connected to logic zero. The output of the initial setting circuit is connected to the reset inputs of the two D-triggers, and the corresponding output of the movements register is connected to a second input of the NAND circuit and to the D-input of the second D-trigger whose output is connected to the reset input of the second RS-trigger and to the current input of the stepper motor bipolar control circuit. The corresponding output of the directions register is connected to an input of the multiplexor, an output of which is connected to a D-input of the second D-register whose corresponding output is connected to a phase input of the stepper motor bipolar control circuit and to a second input of the multiplexor, a second output of which is connected to a second D-input of the second D-register whose corresponding second output is connected to a third input of the multiplexor and to a second phase input of the stepper motor bipolar control circuit. The first two outputs of the stepper motor bipolar control circuit are connected to the two ends of the winding of the corresponding stepper motor, and the second two outputs are connected to the two ends of its second winding.

The advantages of the invention are the reliable performance of tasks for positioning of a great number of steps, with a great number of axes controlled with different velocity and the reliable connection with the technological equipment with minimum participation of the microprocessor. Another advantage is the possibility of supplying small current to the windings of the stepper motors, which are not actuated, decreasing in this way the power consumption of the peripheral control device. Still another advantage is the possibility of controlling various electromechanical devices operated by stepper motors.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
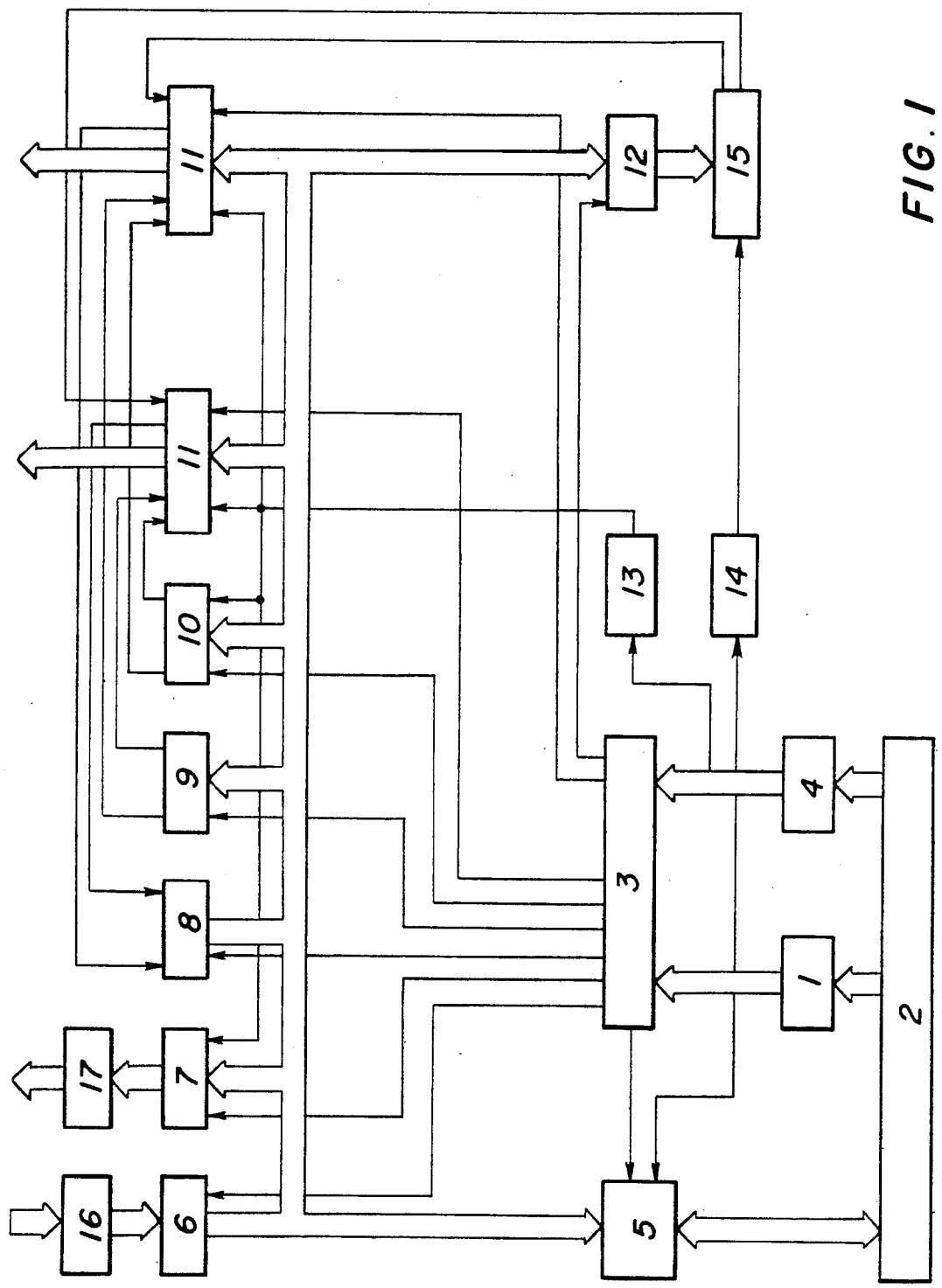
FIG. 1 is a block diagram of the peripheral control device.

The peripheral control device shown in FIG. 1 contains an address buffer 1 (first buffer), the inputs of which are connected to the address buses of a microprocessor 2, and the outputs of which are connected to the inputs of a decoder 3 whose second inputs are connected to the outputs of a control buffer 4 (second buffer), the inputs of which are connected to the control buses of the microprocessor 2.

The write-read signal from the outputs of the control buffer 4 is connected also to the direction input of a bidirectional data buffer 5 whose selection input is connected to an output of the decoder 3, and the data buses of the microprocessor 2 are bidirectionally connected to the inputs/outputs of the bidirectional data buffer 5 whose second inputs/outputs are connected to the outputs of the input register 6 (first register), to the data inputs of a output register 7 (second register), to the outputs of a ready register 8 (third register), to the data inputs of a directions register 9 (fourth register), to the data inputs of a movements register 10 (fifth register), to the data inputs of n stepper motor control units 11 and to the data inputs of a counter control register 12 (sixth register).

A second output of the decoder 3 is connected to the write-enabling input of the first register 6, a third output is connected to the write input of the second register 7, a fourth output is connected to the write-enabling input of the third register 8, a fifth output is connected to the write input of the fourth register 9, a sixth output is connected to the write input of the fifth register 10, a seventh output is connected to the loading input of the first stepper motor control unit 11, an n-6th output is connected to the loading input of the n-th stepper motor control unit 11, and an n-7th output is connected to the write input of the sixth register 12.

The reset signal from the outputs of the second buffer 4 is connected to the input of an initial setting circuit 13 whose output is connected to the reset inputs of the second and fifth registers 7 and 10 and of the first and the n-th stepper motor control unit 11.

The clock signal from the outputs of the second buffer 4 is connected also to the input of a monostable multivibrator 14 whose output is connected to the counting input of a programmable counter 15, the inputs of which are connected to the outputs of the sixth register 12, and its output is connected to the clock input of the first stepper motor control unit 11, and the n-th output is connected to the clock input of the n-th stepper motor control unit 11.

The output of the fourth register 9 is connected to the direction input of the first stepper motor control unit 11, and its n-th output is connected to the directional input of the n-th stepper motor control unit 11. An output of the fifth register 10 is connected to the movement input of the first stepper motor control unit 11, and the n-th output is connected to the movement input of the n-th stepper motor control unit 11.

The availability output of the first stepper motor control unit 11 is connected to a first input of the third register 8 whose n-th input is connected to the availability output of the n-th stepper motor control unit 11.

The outputs of the first stepper motor control unit 11 are connected to the windings of the first stepper motor of the robot, and outputs of the n-th stepper motor control unit 11 are connected to the windings of the n-th stepper motor of the robot. The sensors are connected to the inputs of a shaper 16 whose outputs are connected to the inputs of the first register 6, and the outputs of the second register 7 are connected to the relays 17 which are connected to the robot actuating mechanisms [not shown] controlled by them.

Figure 2:
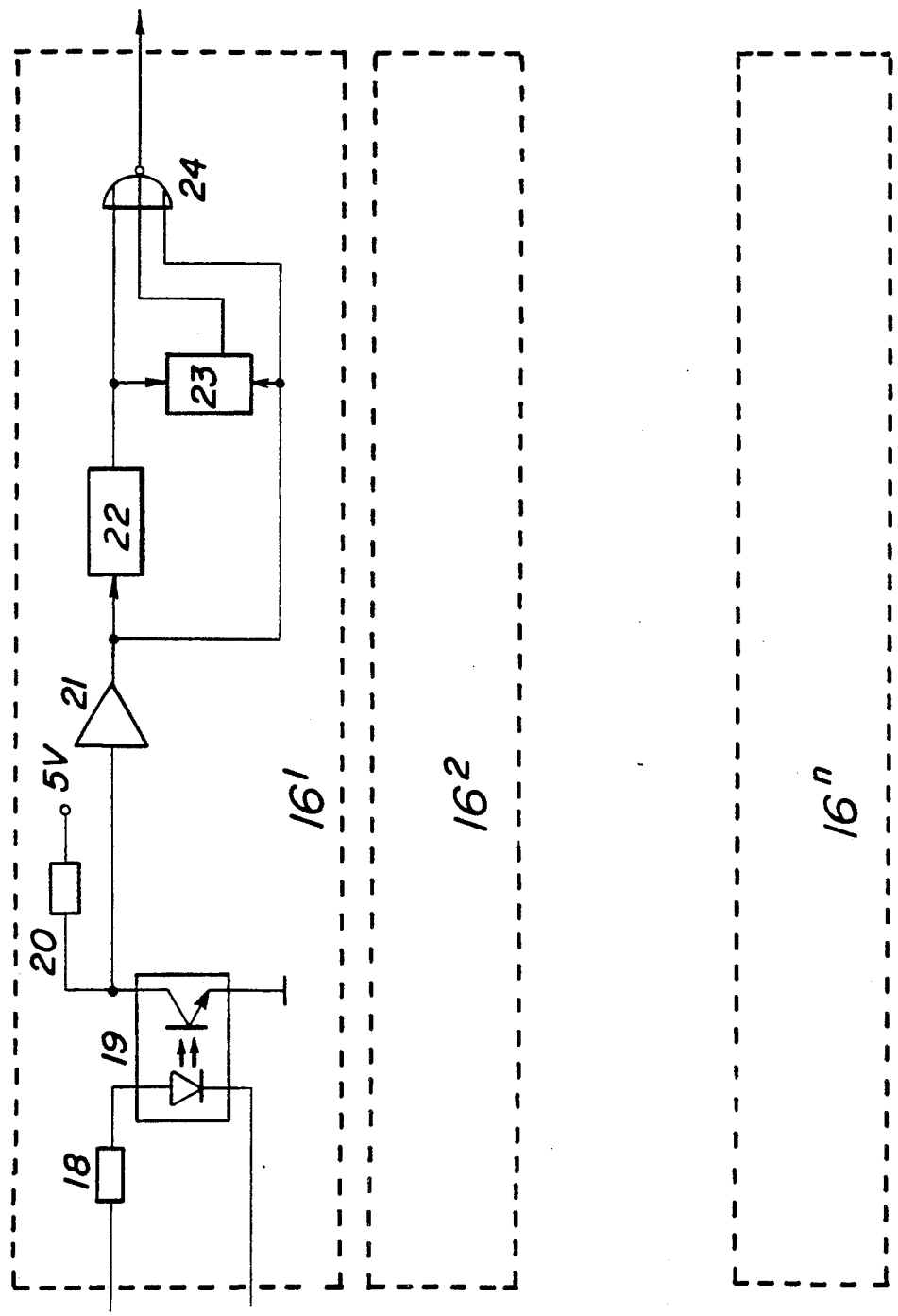
FIG. 2 is a functional diagram of the shaper.

Referring now to FIG. 2, the shaper 16 is an n-channel one and each channel contains a resistor 18, an opto-isolator 19, a second resistor 20, a Schmitt trigger 21, a second monostable multivibrator 22, an RS-trigger 23 and a NOR circuit 24. One end of the sensor is connected through the first resistor 18 to the anode of the opto-isolator 19 and the other end is connected to its cathode. The emitter of the opto-isolator 19 is connected to logic zero, and its collector is connected through the second resistor 20 to a supply voltage, the collector of the opto-isolator 19 being connected also to the input of the Schmitt trigger 21 whose output is connected to the input of the second monostable multivibrator 22, to the setting input of the RS-trigger 23 and to an input of the NOR circuit 24. The output of the second monostable multivibrator 22 is connected to a second input of the NOR circuit 24 and to the reset input of the RS-trigger 23 whose output is connected to a third input of the NOR circuit 24. The output of the NOR circuit 24 is connected to a corresponding input of the first register 6.

Figure 3:
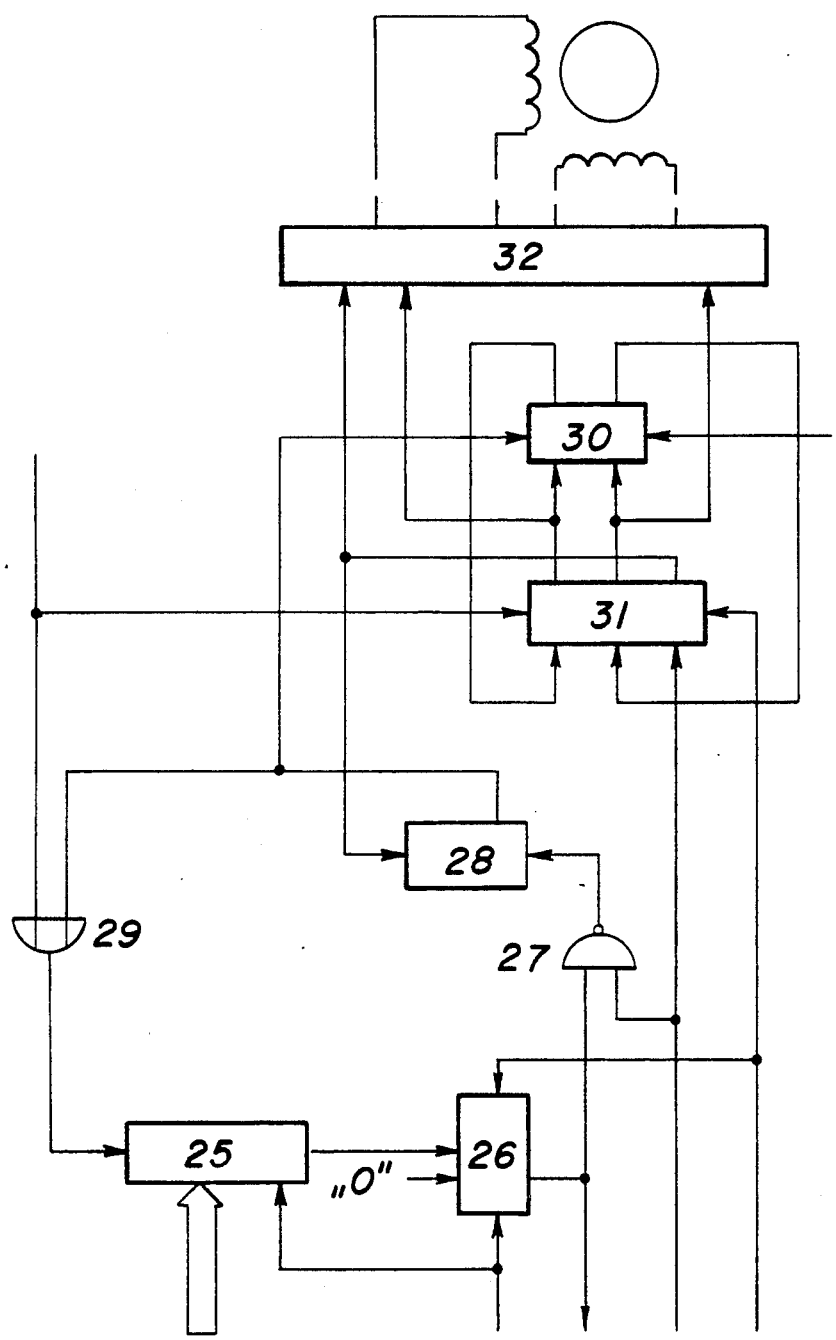
FIGS. 3 and 4 are functional diagrams of alternate embodiments of the stepper motor control unit.

Referring now to FIG. 3, the stepper motor control unit 11 contains a synchronous subtract counter 25, a D-trigger 26, a NAND circuit 27, a second RS-trigger 28, an OR circuit 29, a programmable read-only memory 30, a D-register 31 and a stepper motor bipolar control circuit 32. It is expedient that the stepper motor bipolar control circuit 32 should be realized by two integrated circuits such as 1 PU 3717 (TEA3717) and resistors and capacitors required for their operation.

The data inputs of the synchronous subtract counter 25 are connected to the second inputs/outputs of the bidirectional buffer 5 and the corresponding output of the decoder 3 is connected to the loading input of the synchronous subtract counter 25 and to setting input of the D-trigger 26 whose output is connected to an input of the NAND circuit 27 and to the corresponding input of the third register 8. The output of the NAND circuit 27 is connected to the setting input of the second RS-trigger 28 whose output is connected to an input of the OR circuit 29 and to an input of the programmable read-only memory 30. The corresponding output of the programmable counter 15 is connected to the clock input of the D-register 31 and to a second input of the OR circuit 29, the output of which is connected to the counting input of the synchronous subtract counter 25 whose carry output is connected to the clock input of the D-trigger 26, the D-input of which is connected to logic zero.

The output of the initial setting circuit 13 is connected to the reset inputs of the D-trigger 26 and D-register 31, and the corresponding output of the fifth register 10 is connected to a second input of the NAND circuit 27 and to a D-input of the D-register 31 whose corresponding output is connected to the reset input of the second RS-trigger 28 and to the current input of the stepper motor bipolar control circuit 32.

The corresponding output of the fourth register 9 is connected to a second input of the programmable read-only memory 30, an output of which is connected to a second D-input of the D-register 31 whose corresponding second output is connected to a phase input of the stepper motor bipolar control circuit 32 and to a third input of the programmable read-only memory 30, a second output of which is connected to a third D-input of the D-register 31 whose corresponding third output is connected to a fourth input of the programmable read-only memory 30 and to a second phase input of the stepper motor bipolar control circuit 32.

The first two outputs of the stepper motor bipolar control circuit 32 are connected to the two ends of the winding of the corresponding stepper motor and the second two outputs are connected to the two ends of its second winding.

Figure 4:
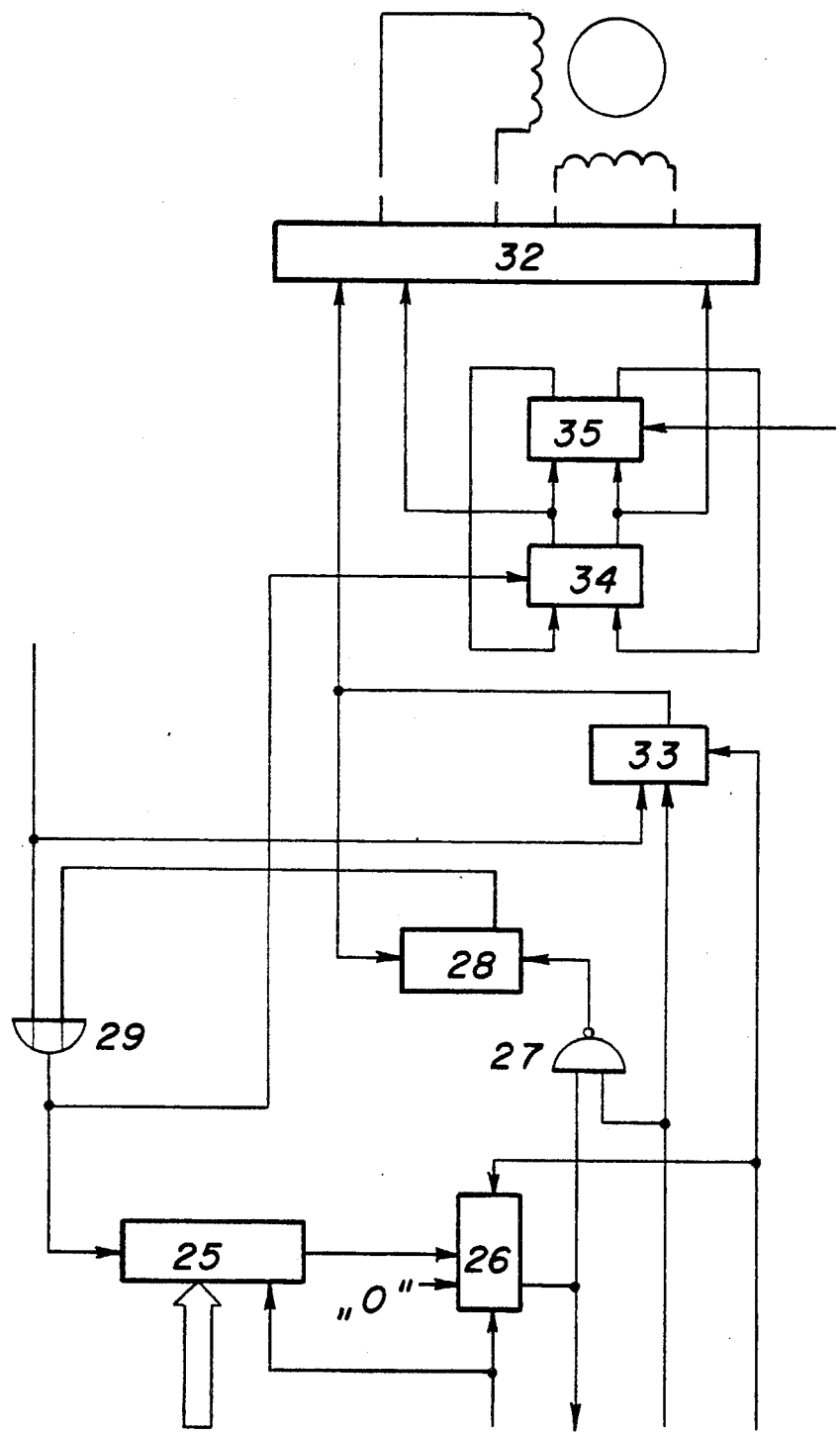

Referring now to FIG. 4, some stepper motor control units 11 can contain a synchronous subtract counter 25, a D-trigger 26 an NAND circuit 27, a second RS-trigger 28, an OR circuit 29, a second D-trigger 33, a second D-register 34, a multiplexor 35 and a stepper motor bipolar control circuit 32.

The data inputs of the synchronous subtract counter 25 are connected to the second inputs/outputs of the bidirectional data buffer 5, and the corresponding output of the decoder 3 is connected to the loading input of the synchronous subtract counter 25 and to the setting input of the first D-trigger 26 whose output is connected to an input of the NAND circuit 27 and to the corresponding input of the third register 8.

The output of the NAND circuit 27 is connected to the setting input of the second RS-trigger 28 whose output is connected to an input of the OR circuit 29. The corresponding output of the programmable counter 15 is connected to the clock input of the second D-trigger 33 and to a second input of the OR circuit 29, the output of which is connected to the clock input of the second D-register 34 and to the counting input of the synchronous subtract counter 25 whose carry output is connected to the clock input of the first D-trigger 26, the D-input of which is connected to logic zero.

The output of the initial setting circuit 13 is connected to the reset inputs of the two D-triggers 26 and 33 and the corresponding output of the fifth register 10 is connected to a second input of the NAND circuit 27 and to the D-input of the second D-trigger 33 whose output is connected to the reset input of the second RS-trigger 28 and to the current input of the stepper motor bipolar control circuit 32.

The corresponding output of the fourth register 9 is connected to an input of the multiplexor 35, an output of which is connected to a D-input of the second D-register 34 whose corresponding output is connected to a phase input of the stepper motor bipolar control circuit 32 and to a second input of the multiplexor 35, a second output of which is connected to a second D-input of the second D-register 34 whose corresponding second output is connected to a third input of the multiplexor 35 and to a second phase input of the stepper motor bipolar control circuit 32.

The first two outputs of the stepper motor bipolar control circuit 32 are connected to the two ends of the winding of the corresponding stepper motor and the second two outputs are connected to the ends of its second winding.

MANNER OF OPERATION

The operation of the peripheral control device is as follows:

On switching-on of the power supply or entering of a reset signal from the microprocessor 2, the initial setting circuit 13 produces a pulse which resets the second 7 and the fifth 10 registers, the first D-trigger 26 and the first D-register 31. The second register 7 sets the relays 17 in switched-off state, and the reset fifth register 10 feeds logic zero to the second input of the NAND circuit 27 and to the first D-input of the first D-register 31.

After the reset of the first D-trigger 26 and the fifth register 10, the second RS-trigger 28 is set, which inhibits the OR circuit 29 from passing through negative clock pulses which are continually produced by the programmable counter 15, and simultaneously controls by the first input the programmable read-only memory 30 so that it repeats at its first and second output the corresponding states from the second and third output of the first D-register 31 and as a result when pulses are fed to the clock input of the first D-register 31 it does not change its zero state, i.e. does not change also the logic zero at the three inputs of the stepper motor bipolar control circuit 32. This circuit supplies small current to the two windings of the stepper motor when there is a logic zero at its current input, and if the states of the phase inputs do not change, respectively it does not change the current directions in the windings of the stepper motor and the stepper motor does not move.

After the initial setting, the microprocessor 2 can address, through the address, control and data buses, the peripheral control device as a part of working memory. The write-read signal determines the passing of data through the bidirectional buffer 5 which is selected only when the decoder 3 decodes a call to the peripheral control device, i.e. with a reading operation from the first 6 or the third 8 register, or with a writing operation in the second 7, fourth 9, fifth 10 or sixth 12 register or in the stepper motor control unit 11. The pulses produced by means of these operations at the outputs of the decoder 3 have a length determined by the active half-cycle of the clock signal, by whose trailing edge the appearance and the disappearance of the data are read, and at the same time the monostable multivibrator 14 is actuated periodically.

If the sensor is not actuated, no current flows through the photosensitive diode of the opto-isolator 19 from the corresponding channel of the shaper 16 and the opto-isolator transistor is disabled. The Schmitt trigger 21 converts the high level from the collector of the opto-isolator transistor into logical one, which sets the RS-trigger 23. The NOR circuit 24 has at its output logical zero, as at its first and third inputs a logical one is set.

When the sensor is actuated, a current, limited by the resistor 18, begins to flow through the photosensitive diode of the opto-isolator 19, and as a consequence the transistor is enabled. The Schmitt trigger 21 converts the low level from the collector of the opto-isolator transistor into logical zero, which actuates the second monostable multivibrator 22. The second monostable multivibrator 22 produces at its output a positive pulse which resets the RS-trigger 23, after blocking by the second input of the NOR circuit 24 the logical zero at its output.

The positive pulse at the output of the second monostable multivibrator 22 is regulated so as to be with a greater length than the noises incoming from the sensor, and after its finish, the logical zeros at the three inputs of the NOR circuit 24 set at its output a logical one, which is fed to the corresponding input of the first register 6. If after that the opto-isolator transistor is disabled, a logical zero is set immediately at the output of the NOR 24. The logical zero is maintained by the RS-trigger 23.

The signals from the sensors, converted and cleared from the noises, are written in the first register 6 by the leading edge of the pulse from the second output of the decoder 3, during which the outputs with three states of the first register 6 are enabled and the data are read by the microprocessor 2.

The relays 17 are switched by means of writing of control data in the second register 7 realized by the trailing edge of the pulse from the third output of the decoder 3.

The availability signals from the stepper motor control unit 11 are written in the third register 8 by the leading edge of the pulse from the fourth output of the decoder 3, during which the outputs with three states of the third register 8 are enabled and the data are read by the microprocessor 2.

The control data of direction and motion, necessary for the operation of the stepper motor control units 11, are written in the fourth register 9 and in the fifth register 10 by the trailing edge of the pulse respectively from the fifth and the sixth output of the decoder 3. In the same way data are written in the sixth register 12, which control the programmable counter 15, which produces continuous clock pulses determining rotation velocity of the stepper motors. These negative clock pulses have a length determined by the monostable multivibrator 14 and fit temporarily within the inactive half-cycle of the clock signal of the microprocessor 2.

By the leading edge of the pulse from the corresponding output of the decoder 3, the first D-trigger 26 is set and by the trailing edge the positioning task of the corresponding stepper motor is loaded in the synchronous subtract counter 25.

The availability signal from the output of the first D-trigger 26 can be read by the microprocessor 2 through the third register 8, showing that there is a loaded and not executed task. After the loading of the task, if the microprocessor 2 assigns motion through logical one at the corresponding output of the fifth register 10, then after the trailing edge of the first clock pulse fed to the clock input of the first D-register 31, the stepper motor bipolar control circuit 32 will supply large current to the windings, and the second RS-trigger 28 will be reset.

The reset second RS-trigger 28 permits the passing of the negative clock pulses through the OR circuit 29 and at the same time controls the programmable read-only memory 30 so as to produce at its two outputs the next states according to the Gray code following those of the second and third output of the first D-register 31 in direction determined through the second input of the programmable read-only memory 30. In this way on each following clock pulse the reversible counter in Gray code, realized by the programmable read-only memory 30 and the first D-register 31, changes the state of only one of the two phase inputs of the stepper motor bipolar control circuit 32, which respectively changes the direction of the current in one of the windings, moving, by means of large current, the stepper motor completely to the next step in the direction preliminarily written in the fourth register 9.

By the trailing edge of the clock pulse, the synchronous subtract counter 25 decreases its content and when it reverses its carry output, it produces a pulse, synchronous with the clock pulse entering its counting input, which by its trailing edge resets the first D-trigger 26. This reset of the first D-trigger 26 is realized by the first clock pulse, if an all-zero task has been loaded, and by the 256-th pulse, if it has been all ones, with 8-bit data, and synchronously with it in the first D-register 31 the last writing in this task is realized, i.e. the execution by the stepper motor of the last step begins.

Before the next clock pulse, the microprocessor 2 can read through the third register 8 the availabilities, analyze them and complete the task loading without cancelling the motion. If the task loading is not completed, the reset first D-trigger 26 keeps the second RS-trigger 28 set, as its reset input and the programmable read-only memory 30 repeats at its first and second output the corresponding states of the second and the third output of the first D-register 31 and the stepper motor ceases its motion after the execution of the last step.

If the microprocessor 2 cancels the motion before the first clock pulse entering after the reset of the first D-trigger 26, then immediately after the execution of the last step a small current is supplied to the windings. In the presence of motion, a large current is always supplied from the fifth register 10, irrespective of the presence of a loaded task, and this possibility is used if there is a necessity of a large braking moment when the stepper motor is out of motion, for example a few hundred milliseconds for damping after stopping.

The reliable functioning of the synchronously operated stepper motor control unit 11 is secured by the following conditions:

the leading edge of the negative clock pulse, due to the delay with the triggering of the monostable multivibrator 14 and the switching of the programmable counter 15, appears at the second input of the OR circuit 29 after the setting of the second RS-trigger 28;

the trailing edge of the negative clock pulse appears at the clock input of the first D-register 31 after the setting of the signals at its D-inputs, as the length of the clock pulse determined by the monostable multivibrator 14 is greater than the delay of the programmable read-only memory 30 plus the necessary precedence at the D-inputs of the first D-register 31.

With the second disclosed embodiment, with the same functional capabilities of the stepper motor control unit 11, the reversible counter in Gray code is realized by the second D-register 34 and the multiplexor 35, used as a function generator. In order to reduce by one the number of the inputs of the multiplexor 35, having limited capabilities as a function generator, the second D-register 34 is timed by the output of the OR circuit 29 when the stepper motor must be in motion and a second D-trigger 33 is switched on.

The rotation velocity of each of the n stepper motors is determined by the frequency of the clock pulses produced at the corresponding output of the programmable counter 15, each of these frequencies being controlled independently of the others through the register 12 by the microprocessor 2. This affords the opportunity not only of controlling the stepper motors with different velocities, but also of changing independently each of them during motion, i.e., of realizing, if necessary, the corresponding control, e.g. on starting and stopping.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A peripheral control device for controlling the movements of a robot with a microprocessor, said robot having a plurality of stepper motors and sensors, said peripheral control device comprising:

an address buffer and a decoder, the inputs of said address buffer being connected to the address buses of said microprocessor, and the outputs of the address buffer being connected to the inputs of said decoder;

a control buffer, the outputs of said control buffer being connected to second inputs of the decoder, the inputs of the control buffer being connected to the control buses of the microprocessor;

a bidirectional buffer, the write-read signal from the outputs of the control buffer being connected to the direction control input of the bidirectional buffer and the enable input of the bidirectional buffer being connected to an output of the decoder;

the data buses of the microprocessor being connected bidirectionally to the inputs/outputs of the bidirectional buffer;

a first register and a second register, the second inputs/outputs of the bidirectional buffer being connected to the outputs of said first register and to parallel data inputs of said second register;

a second output of the decoder being connected to the write-enable input of the first register, and a third output of the decoder being connected to the write input of the second register;

a third, fourth, fifth and sixth register and n-number of stepper motor control units, each stepper motor control unit having inputs for clock, parallel data, loading, reset, direction and motion and outputs for ready;

the second inputs/outputs of the bidirectional buffer being connected also to the outputs of said third register, to the parallel data inputs of said fourth register, to the parallel data inputs of said fifth register, to the parallel data inputs of n stepper motor control units, and to the parallel data inputs of said sixth register;

a fourth output of the decoder being connected to the write-enable input of the third register, a fifth output of the decoder being connected to the write input of the fourth register, a sixth output of the decoder being connected to the write input of the fifth register, a seventh output of the decoder being connected to a loading input of the first stepper motor control unit, an n+6th output of said decoder being connected to the loading input of the n-th stepper motor control unit, an n+7th output of said decoder being connected to the write input of the sixth register;

an initial setting circuit, the reset signal from the outputs of the control buffer being connected to the input of the initial setting circuit, the output of the initial setting circuit being connected to the reset inputs of the second and fifth registers and of the first and of the n-th stepper motor control unit;

a monostable multivibrator and a programmable counter, the clock signal from the outputs of the control buffer being connected to the input of said monostable multivibrator;

the output of the monostable multivibrator being connected to the counting input of said programmable counter, the inputs of the programmable counter being connected to the outputs of the sixth register and a first output of the programmable counter being connected to the clock input of the first stepper motor control unit, and an n-th output of the programmable counter being connected to the clock input of the n-th stepper motor control unit;

an output of the fourth register being connected to the direction input of the first stepper motor control unit and an n-th output of the fourth register being connected to the direction input of the n-th stepper motor control unit;

an output of the fifth register being connected to the movement input of the first stepper motor control unit, and an n-th output of the fifth register being connected to the movement input of the n-th stepper motor control unit;

a ready output of the first stepper motor control unit being connected to an input of the third register and the n-th input of the third register being connected to the ready output of the n-th stepper motor control unit;

the control outputs of the first stepper motor control unit being connected to the windings of the first stepper motor of the robot, and the control outputs of the n-th stepper motor control unit being connected to the windings of the n-th stepper motor of the robot; and a signal shaper, the sensors being connected to the inputs of said signal shaper, the outputs of said signal shaper being connected to the inputs of the first register.

2. A peripheral control device as claimed in claim 1, wherein the signal shaper is an n-channel one, each channel containing a resistor, an optocoupler, a second resistor, a Schmitt trigger, a second monostable multivibrator, an RS-trigger and a NOR circuit;

one pole of a sensor being connected through the first resistor to the anode of the optocoupler and the other pole of the sensor being connected to the cathode of the optocoupler;

the emitter of the optocoupler being connected to logic zero, and the collector of the optocoupler being connected through the second resistor to a voltage supply;

the collector of the optocoupler being connected also to the input of the Schmitt trigger, the output of the Schmitt trigger being connected to the input of the second monostable multivibrator, to the set input of the RS-trigger and to an input of the NOR circuit;

the output of the second monostable multivibrator being connected to a second input of the NOR circuit and to the reset input of the RS-trigger;

the output of the RS-trigger being connected to a third input of the NOR circuit; and the output of the NOR circuit being connected to a corresponding input of the first register.

3. A peripheral control device as claimed in claim 1, wherein the stepper motor control unit contains a synchronous subtract counter, a D-trigger, a NAND circuit, a second RS-trigger, an OR circuit, a programmable read-only memory, a D-register and a stepper motor bipolar control circuit;

data inputs of the synchronous subtract counter being connected to the second inputs/outputs of the bidirectional buffer and a corresponding output of the decoder being connected to the parallel loading input of the synchronous subtract counter and to the set input of the D-trigger;

the output of the D-trigger being connected to an input of the NAND circuit and to a corresponding input of the third register;

the output of the NAND circuit being connected to the set input of the RS-trigger;

the output of the RS-trigger being connected to an input of the OR circuit and to an input of the programmable read-only memory;

a corresponding output of the programmable counter being connected to the clock input of the D-register and to a second input of the OR circuit;

the output of the OR circuit being connected to the counting input of the synchronous subtract counter, the carry output of the subtract counter being connected to the clock input of the D-trigger, the D-input of the D-trigger being connected to logic zero;

the output of the initial setting circuit being connected to the reset inputs of the D-trigger and D-register;

a corresponding output of the fifth register being connected to a second input of the NAND circuit and to a D-input of the D-register;

a corresponding output of the D-register being connected to the reset input of the RS-trigger and to the current input of the stepper motor bipolar control circuit;

a corresponding output of the fourth register being connected to a second input of the programmable read-only memory;

an output of the programmable read-only memory being connected to a second D-input of the D-register;

a corresponding second output of the D-register being connected to a phase input of the stepper bipolar control circuit and to a third input of the programmable read-only memory;

a second output of the programmable read-only memory being connected to a third D-input of the D-register;

a corresponding third output of the D-register being connected to a fourth input of the programmable read-only memory and to a second phase input of the stepper motor bipolar control circuit;

the first two outputs of the stepper motor bipolar control circuit being connected to the two ends of the winding of the corresponding stepper motor, and the second two outputs are connected to the two ends of the second winding.

4. A peripheral control device as claimed in claim 1, wherein the stepper motor control unit contains a synchronous subtract counter, a D-trigger, a NAND circuit, a second RS-trigger, an OR circuit, a second D-trigger, a second D-register, a multiplexor and a stepper motor bipolar control circuit, the data inputs of the synchronous subtract counter being connected to the second inputs/outputs of the bidirectional buffer, and a corresponding output of the decoder being connected to the parallel loading input of the synchronous subtract counter and to the set input of the first D-trigger;

the output of the first D-trigger being connected to an input of the NAND circuit and to a corresponding input of the third register, and the output of the NAND circuit being connected to the set input of the second RS-trigger;

the output of the second RS-trigger being connected to an input of the OR circuit, and a corresponding output of the programmable counter being connected to the clock input of the second D-trigger and to a second input of the OR circuit;

the output of the OR circuit being connected to the clock input of the second D-register and to the counting input of the synchronous subtract counter;

the carry output of the synchronous subtract counter being connected to the clock input of the first D-trigger, the D-input of the first D-trigger being connected to logic zero, and the output of the initial setting circuit being connected to the reset inputs of the two D-triggers;

a corresponding output of the fifth register being connected to a second input of the NAND circuit and to the D-input of the second D-trigger;

the output of the second D-trigger being connected to the reset input of the second RS-trigger and to the current input of the stepper motor bipolar control circuit;

a corresponding output of the fourth register being connected to an input of the multiplexor, an output of the multiplexor being connected to a D-input of the second D-register;

a corresponding output of the second D-register being connected to a phase input of the stepper motor bipolar control circuit and to a second input of the multiplexor;

a second output of the multiplexor being connected to a second D-input of the second D-register;

a corresponding second output of the second D-register being connected to a third input of the multiplexor and to a second phase input of the stepper motor bipolar control circuit;

the first two outputs of the stepper motor bipolar control circuit being connected to the two ends of the winding of the corresponding stepper motor, and the second two outputs are connected to the two ends of its second winding.

* * * * *